(12) United States Patent
Vollert et al.

(10) Patent No.: US 9,139,186 B2
(45) Date of Patent: Sep. 22, 2015

(54) ELECTROMECHANICAL BRAKE BOOSTER

(75) Inventors: Herbert Vollert, Vaihingen/Enz (DE);
Remy Garnier, Remseck (DE);
Reinhard Weiberle, Vaihingen/Enz (DE); Timo Jahnz, Besigheim (DE);
Jens Kolarsky, Bietigheim/Bissingen (DE); Stephan Hoenle, Korntal-Muenchingen (DE)

(73) Assignee: Robert Bosch GmbH, Stuttgart (DE)

( * ) Notice: Subject to any disclaimer, the term of this patent is extended or adjusted under 35 U.S.C. 154(b) by 1019 days.

(21) Appl. No.: 13/203,239

(22) PCT Filed: Dec. 28, 2009

(86) PCT No.: PCT/EP2009/067937
§ 371 (c)(1),
(2), (4) Date: Nov. 7, 2011

(87) PCT Pub. No.: WO2010/097135
PCT Pub. Date: Sep. 2, 2010

(65) Prior Publication Data
US 2012/0042647 A1 Feb. 23, 2012

(30) Foreign Application Priority Data
Feb. 25, 2009 (DE) .......... 10 2009 001 142

(51) Int. Cl.
*B60T 13/74* (2006.01)
*F16H 1/16* (2006.01)
*F16H 19/04* (2006.01)
*F16H 35/00* (2006.01)

(52) U.S. Cl.
CPC .......... *B60T 13/745* (2013.01); *F16H 1/16* (2013.01); *F16H 19/04* (2013.01); *F16H 2035/003* (2013.01)

(58) Field of Classification Search
CPC ..... F16H 1/16; F16H 19/04; F16H 2035/003; F15B 7/001; F15B 7/08; B60T 13/745
USPC ............................................ 60/545, 538, 594
See application file for complete search history.

(56) References Cited

U.S. PATENT DOCUMENTS

| 1,612,994 A * | 1/1927 | Strid ............................. 74/508 |
| 2,493,377 A * | 1/1950 | Zeilman ......................... 60/545 |
| 2004/0011603 A1 | 1/2004 | Yokoyama et al. |

FOREIGN PATENT DOCUMENTS

| DE | 30 31 643 | 4/1982 |
| DE | 103 12 207 | 10/2003 |

(Continued)

OTHER PUBLICATIONS

International Search Report corresponding to PCT Application No. PCT/EP2009/067937, mailed Aug. 12, 2010 (German and English language document) (7 pages).

*Primary Examiner* — Dwayne J White
*Assistant Examiner* — Logan Kraft
(74) *Attorney, Agent, or Firm* — Maginot, Moore & Beck LLP

(57) ABSTRACT

An electromechanical brake booster is disclosed. The brake booster is constructed with two worm gears which run in opposite directions and whose axial forces compensate one another. The worm gears drive toothed rack gears which convert a rotational driving movement into a translatory output movement for activating a master brake cylinder. As a result of the provision of two gear paths, the loading of each gear path is halved and an application of force to a booster body, which forms a gear output, is symmetrical.

41 Claims, 1 Drawing Sheet

(56) References Cited

FOREIGN PATENT DOCUMENTS

| | | |
|---|---|---|
| DE | 103 27 553 | 1/2005 |
| DE | 10 2007 018 469 | 10/2008 |
| EP | 0 395 262 | 10/1990 |
| JP | 3-121324 A | 5/1991 |
| JP | 2007-239998 A | 9/2007 |
| RU | 2 029 891 C1 | 2/1995 |
| WO | 2008/128811 A1 | 10/2008 |

* cited by examiner

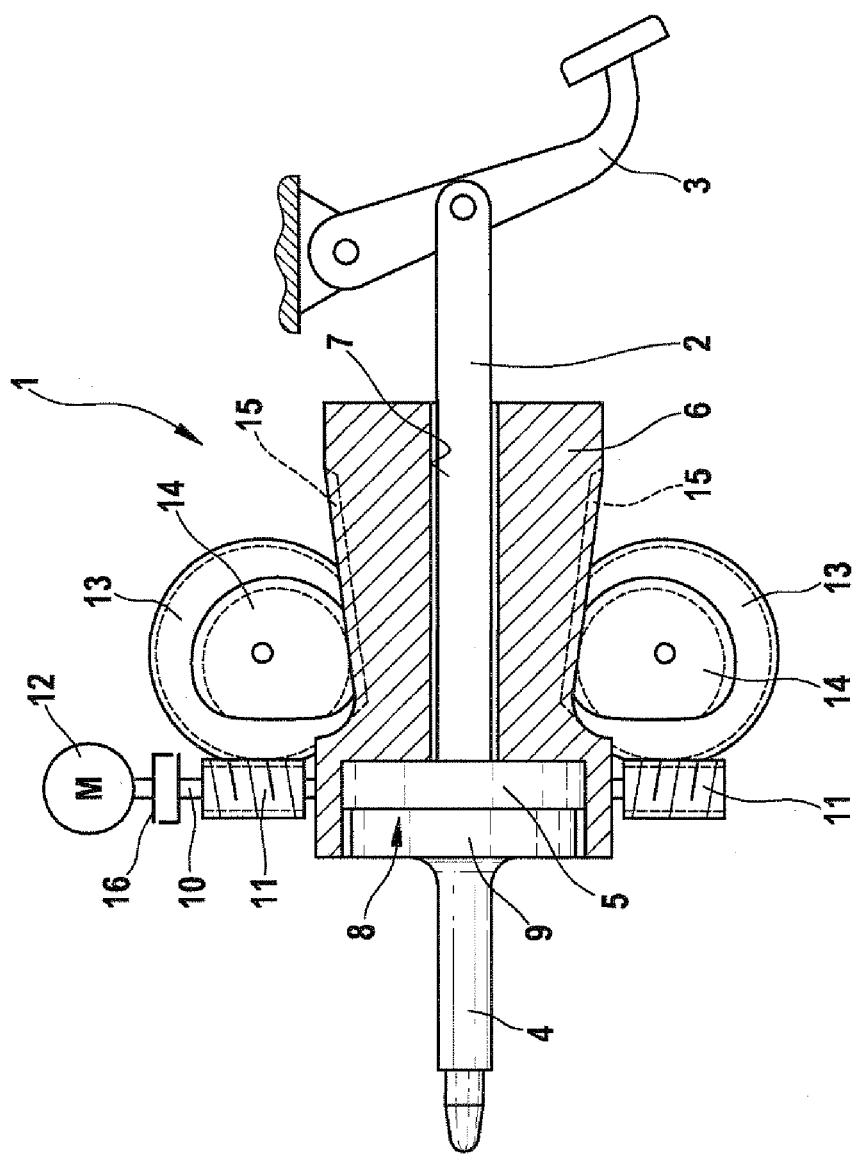

ELECTROMECHANICAL BRAKE BOOSTER

This application is a 35 U.S.C. §371 National Stage Application of PCT/EP2009/067937, filed Dec. 28, 2009, which claims the benefit of priority to Application Serial No. DE 10 2009 001 142.0, filed Feb. 25, 2009 in Germany, the disclosures of which are incorporated herein by reference in their entirety.

BACKGROUND

The disclosure relates generally to an electromechanical brake booster.

Laid-Open Patent Application DE 103 27 553 A1 discloses an electromechanical brake booster having a hollow shaft electric motor whose hollow rotor has a spindle nut which engages with a hollow spindle. The spindle nut and the spindle form a spindle drive or generally a helical gear mechanism which converts a rotational drive movement of the electric motor into a translational output movement for activating a hydraulic master brake cylinder. The spindle drive of the known electromechanical brake booster therefore forms a rotational/translational conversion gear mechanism. The translational output movement of the hollow spindle is transmitted to a driver which is fixedly arranged on a piston rod of the brake booster. The piston rod is connected in an articulated fashion to a brake pedal and is acted on by the muscle force of a vehicle driver via the brake pedal for the purpose of activating the brakes. The piston rod is connected to a piston of the master brake cylinder and transmits the muscle force and the boosting force of the brake booster to the piston of the master brake cylinder. In customary terminology the piston rod of the known brake booster also forms at the same time the pressure rod thereof.

A further electromechanical brake booster is disclosed by German Laid-Open Patent Application DE 30 31 643 A1. This brake booster also has an electric motor which drives a multi-disk clutch via a worm gear mechanism. The rotational drive movement of the electric motor is input via the multi-disk clutch. The torque which is input via the worm gear mechanism which is connected downstream depends on the axial application of a muscle force to the multi-disk clutch, which muscle force is applied by a vehicle driver in order to activate the brakes.

SUMMARY

The electromechanical brake booster according to the disclosure, having the features set forth below, has an electric motor and a gear mechanism which is driven by the electric motor. The gear mechanism has a rotational/translational conversion gear mechanism which converts a rotational drive movement of the electric motor into a translational output movement in order to activate a hydraulic master brake cylinder. For example, a toothed rack gear mechanism, a helical gear mechanism such as a spindle drive, a ball and nut gear mechanism, a roller gear mechanism, also in the form of a planetary roller screw drive or a belt drive are possibly used as rotational/translational conversion gear mechanism. The enumeration is not exhaustive. The drive or the input of the rotational/ translational conversion gear mechanism does not necessarily also have to be the drive or input of the gear mechanism overall, and a further gear mechanism or a gear stage can be connected upstream of the rotational/translational conversion gear mechanism. The same also applies to the drive side or output of the rotational/translational conversion gear mechanism which does not necessarily have to be the output or drive side of the gear mechanism overall. A further gear mechanism or a gear stage can also be connected downstream of the rotational/translational conversion gear mechanism.

The gear mechanism of the electromechanical brake booster according to the disclosure has a distributor gear mechanism and a combination gear mechanism. The distributor gear mechanism and/or the combination gear mechanism can comprise parts of the rotational/translational conversion gear mechanism. The distributor gear mechanism distributes a gear mechanism input between at least two gear mechanism paths, and the combination gear mechanism combines the gear mechanism paths again to form a common gear mechanism output. As is explained with respect to the rotational/translational conversion gear mechanism, the gear mechanism input of the distributor gear mechanism does not have to be the gear mechanism input of the gear mechanism of the brake booster but rather a gear mechanism or a gear stage can be connected upstream of the distributor gear mechanism. Likewise, the gear mechanism output of the combination gear mechanism does not have to be the output of the gear mechanism overall but rather a further gear mechanism or a gear stage can be connected downstream of the combination gear mechanism. The gear mechanisms can be present in any gear mechanism path, wherein preferably each gear mechanism path has the same gear mechanisms, but this is not absolutely necessary. The gear mechanisms can form the combination gear mechanism.

An advantage of the disclosure is the distribution of the load of the gear mechanism, that is to say of a torque which is transmitted by the gear mechanism and/or of a force which is transmitted by the gear mechanism between at least two gear mechanism paths. The loading of the gear mechanism paths is reduced by this, which permits, for example, the manufacture of parts of the gear mechanism from plastic instead of from steel. A further advantage of the disclosure is the possibility of symmetrical formation and symmetrical application of the translational output movement to an output element of the brake booster.

Advantageous refinements and developments of the features of the disclosure are also set forth below.

The disclosure also provides a multi-stage embodiment of the gear mechanism, for example a step-down gear mechanism is connected upstream of the rotational/translational conversion gear mechanism. A worm gear mechanism, if appropriate also a multi-stage spur gear mechanism, a planetary gear mechanism, a bevel gear mechanism or a crown gearhead are possible as step-down gear mechanisms. The enumeration is not exhaustive. The gear mechanisms can form the distributor gear mechanism and/or can be present in any gear mechanism path. It also applies to a multi-stage gear mechanism design that preferably each gear mechanism path has the same gear mechanisms, but this is not compulsory for the disclosure.

In addition, the disclosure provides a gear mechanism with a changing transmission ratio. In particular, the transmission ratio decreases and/or a step-down ratio increases as there is increasing displacement of an output element of the brake booster. Given the same drive torque of the electric motor, the booster force which is applied by the brake booster becomes larger, whereas at the start of the brake activation process a displacement speed of the output element of the brake booster is higher for a given rotational speed of the electric motor. Known gear mechanisms with a changing transmission ratio are cam mechanisms, even those with a cylindrical cam. Cam mechanisms also include cam gear mechanisms with a cam which can be driven in a rotating or, in particular, a pivoting fashion. This enumeration is also not exhaustive. Particularly for gear mechanisms with a changing transmission ratio, the division among a plurality of such gear mechanisms in a plurality of gear mechanism paths can be advantageous in reducing the loading on the individual gear mechanisms

BRIEF DESCRIPTION OF THE DRAWING

The features of the disclosure will be explained in more detail below with reference to an exemplary embodiment which is illustrated in the drawing. The single FIGURE shows a schematic and simplified illustration of an axial section through an electromechanical brake booster according to the disclosure.

DETAILED DESCRIPTION

The electromechanical brake booster 1 which is illustrated in the drawing has a piston rod 2, which is connected in an articulated fashion to a brake pedal 3, which is not part of the brake booster 1, and a pressure rod 4. A hydraulic master brake cylinder (not illustrated) can be activated with the pressure rod 4 in a manner known per se, i.e. a piston can be pushed into the master brake cylinder. What is referred to as a reaction disk 5, via which a pressure force is transmitted from the piston rod 2 to the pressure rod 4, is arranged between the piston rod 2 and the pressure rod 4. As a result of the brake pedal 3 being depressed, the piston of the master brake cylinder (not illustrated) can be pushed into the master brake cylinder via the piston rod 2, the reaction disk 5 and the pressure rod 4, i.e. the master brake cylinder can be activated with muscle power in the way illustrated. The reaction disk 5 is composed of rubber or of a rubber-elastic plastic.

The brake booster 1 has a booster body 6 with a coaxial through-hole 7 in which the piston rod 2 is accommodated in an axially displaceable fashion. The booster body 6 is also axially displaceable and tapers in the form of a frustum on its outer side in the direction of the pressure rod 4 and widens at a pressure-rod-side end to form a base diameter of the frustum. At the pressure-rod-side end, the booster body 6 has a cylindrical depression 8, in the base of which the through-hole 7 opens and in which the reaction disk 5 rests and subsequently a plate-shaped base 9 of the pressure rod 4 is accommodated.

A worm shaft 10 is arranged transversely with respect to the booster body 6, said worm shaft 10 having two worms 11 which are rigidly connected thereto or integral therewith and are located symmetrically on each side of the booster body 6. The worm shaft 10 can be driven with an electric motor 12. The two worms 11 have opposing pitches of the same size. They mesh with worm gears 13 and form worm gear mechanisms 11, 13 with said gears. As a result of the opposing pitches of the worms 11 and therefore also the fact that the two worm gear mechanisms 11, 13 run in opposite directions, axial forces of the two worms 11 compensate one another when the worm gears 13 are driven, with the result that the worm shaft 10 is free of axial force. A clutch 16 connects the worm shaft 10 in a rotationally fixed and axially moveable fashion to a motor shaft of the electric motor 12. The worm shaft 10 compensates any tolerances in the gear mechanism paths by means of axial displaceability, and the gear mechanism paths are loaded equally.

The worm gears 13 are in a rotationally fixed fashion to spur gears 14 which are arranged opposite one another on each side of the booster body 6. The spur gears 14 mesh with toothed racks 15 of the booster body 6, which run in the longitudinal direction of the booster body 6, in the frustum-shaped region thereof. A distance between the two toothed racks 15 decreases in the direction of the pressure rod 4. The spur gears 14 are at a constant axial distance from one another and from the booster body 6, and they are eccentric, with the result that they compensate the oblique profile of the toothed racks 15 with respect to the axial direction and displacement direction of the booster body 6. The spur gears 14 and the toothed racks 15 form toothed rack gear mechanisms 14, 15 which have changing transmission ratios owing to the eccentricity of the spur gears 14 and the oblique arrangement of the toothed racks 15 with respect to the displacement direction. The transmission ratio of the toothed rack gear mechanisms 14, 15 becomes smaller in the case of displacement of the booster body 6 in the direction of the pressure rod 4, that is to say when the master brake cylinder (not illustrated) is activated; and when the booster body 6 is displaced in the activation direction of the master brake cylinder, a displacement speed of the booster body 6 decreases if a constant rotational speed of the electric motor 12 is assumed, and a booster force of the brake booster 1 increases if a constant drive torque of the electric motor 12 is assumed. A straight profile of the toothed racks 15 is not absolutely necessary according to the disclosure, and in contrast to the illustrated embodiment the toothed racks 15 can have any desired curved profile, they can in particular be rounded in a convex or concave fashion. The shape of the spur gears 14 has to be adapted to the profile of the toothed racks 15, with the result that the toothing arrangements always mesh. A variable axial spacing of the spur gears 14 from one another and from the booster body 6 is also conceivable. Toothed racks 15 with a profile which is parallel to the displacement direction and concentric spur gears 14 are also possible, and in this case the toothed rack gear mechanisms have a constant transmission ratio (not illustrated). The spur gears 14 have a toothing arrangement only in the circumferential region, which meshes or enters into engagement with the toothed racks 15 when the toothing arrangement rotates or pivots.

The booster force of the brake booster 1 is transmitted from the bottom of the depression 8 in the booster body 6 to the base 9 of the pressure rod 4 via the reaction disk 5. The reaction disk 5 adds the muscle force applied to the piston rod 2 via the brake pedal 3 and the booster force applied by the booster body 6 of the brake booster 1 and transmits the forces jointly as an activation force to the base 9 of the pressure rod 4. The two worm gear mechanisms 11, 13 form a distributor gear mechanism which distributes a gear mechanism input between two gear mechanism paths. The gear mechanism input is in this case the worm shaft 10 or the drive torque of the electric motor 12. The two gear mechanism paths each comprise a worm gear mechanism 11, 13 and a toothed rack gear mechanism 14, 15. The two toothed rack gear mechanisms 14, 15 form, with the booster body 6, a combination gear mechanism which combines the torques of the two gear mechanism paths as an axially acting booster force acting on a gear mechanism output, specifically the booster body 6. As a result of the symmetrical design and the symmetrical arrangement of the two gear mechanism paths, the two gear mechanism paths transmit the same load, that is to say equally large torques or forces and the gear mechanism output, specifically the booster body 6 is acted on in a symmetrical fashion: neither a torque nor a lateral force acts on the booster body 6. Overall, the two worm gear mechanisms 11, 13 and the two toothed rack gear mechanisms 14, 15 form a gear mechanism of the brake booster 1. The two gear mechanism paths have multiple stages, specifically two stages. The worm gear mechanisms 11, 13 form a first gear stage, and the toothed rack gear mechanisms 14, 15 form a second gear stage of the gear mechanism paths. The worm gear mechanisms 11, 13 are step-down gear mechanisms and they convert a rotational drive movement into a rotational output movement. The toothed rack gear mechanisms 14, 15 are rotational/translational conversion gear mechanisms which convert a rotational drive movement into a translational output movement. As already stated, the toothed rack gear mechanisms 14, 15 have a changing transmission ratio. As a result of the distribution of the load between two gear mechanism paths, it is possible to manufacture the worm gears 13 from plastic.

The invention claimed is:

1. An electromechanical brake booster, having:
   an electric motor; and
   a gear mechanism which is driven by the electric motor and which has:
      a rotational/translational conversion gear mechanism which converts a rotational drive movement of the electric motor into a translational output movement in order to activate a hydraulic master brake cylinder, and
      a distributor gear mechanism which distributes a gear mechanism input between at least two gear mechanism paths, the distributor gear mechanism having at least two worm gear mechanisms with a common worm drive, wherein the worm gear mechanisms are parts of the gear mechanism paths,
   wherein the rotational/translational conversion gear mechanism further acts as a combination gear mechanism which combines the at least two gear mechanism paths into one gear mechanism output.

2. The electromechanical brake booster as claimed in claim 1, wherein the gear mechanism paths transmit the same load.

3. The electromechanical brake booster as claimed in claim 1, wherein the combination gear mechanism acts on the gear mechanism output symmetrically.

4. The electromechanical brake booster as claimed in claim 1, wherein the gear mechanism has multiple stages.

5. The electromechanical brake booster as claimed in claim 1, wherein the gear mechanism has a changing transmission ratio.

6. The electromechanical brake booster as claimed in claim 1, wherein the worm gears run in opposite directions.

7. The electromechanical brake booster as claimed in claim 1, wherein the combination gear mechanism has two toothed gear mechanisms whose toothed racks form a common gear mechanism output.

8. An electromechanical brake booster, comprising:
   an electric motor; and
   a gear mechanism which is driven by a rotational drive movement of the electric motor and which has:
      a distributor gear mechanism which distributes a gear mechanism input between at least two gear mechanism paths, wherein the gear mechanism paths are the same; and
      a combination gear mechanism which combines the at least two gear mechanism paths into one gear mechanism output, wherein the one gear mechanism output is a translational output movement configured to activate a hydraulic master brake cylinder.

9. The electromechanical brake booster as claimed in claim 8, wherein the combination gear mechanism acts on the gear mechanism output symmetrically.

10. The electromechanical brake booster as claimed in claim 8, wherein the gear mechanism has multiple stages.

11. The electromechanical brake booster as claimed in claim 8, wherein the gear mechanism has a transmission ratio between the gear mechanism input and the gear mechanism output that changes along with the rotational drive movement of the electric motor.

12. The electromechanical brake booster as claimed in claim 8, wherein the distributor gear mechanism has two worm gear mechanisms with a common worm drive, wherein the worm gear mechanisms are parts of two gear mechanism paths.

13. The electromechanical brake booster as claimed in claim 12, wherein the worm gears run in opposite directions.

14. The electromechanical brake booster as claimed in claim 8, wherein the combination gear mechanism has two toothed gear mechanisms whose toothed racks together form the one gear mechanism output.

15. An electromechanical brake booster, having:
   an electric motor; and
   a gear mechanism which is driven by the electric motor and which has:
      a rotational/translational conversion gear mechanism which converts a rotational drive movement of the electric motor into a translational output movement in order to activate a hydraulic master brake cylinder, and
      a distributor gear mechanism which distributes a gear mechanism input between at least two gear mechanism paths,
   wherein the rotational/translational conversion gear mechanism further acts as a combination gear mechanism which combines the at least two gear mechanism paths into one gear mechanism output, and
   wherein the gear mechanism is configured to have a gear ratio between the gear mechanism input and the gear mechanism output that changes along with the rotational drive movement of the electric motor; and
   wherein the distributor gear mechanism has at least two worm gear mechanisms with a common worm drive, wherein the worm gear mechanisms are parts of the at least two gear mechanism paths.

16. The electromechanical brake booster as claimed in claim 15, wherein the at least two gear mechanism paths transmit the same load.

17. The electromechanical brake booster as claimed in claim 15, wherein the combination gear mechanism acts on the gear mechanism output symmetrically.

18. The electromechanical brake booster as claimed in claim 15, wherein the gear mechanism has multiple stages.

19. The electromechanical brake booster as claimed in claim 15, wherein the worm gears run in opposite directions.

20. The electromechanical brake booster as claimed in claim 15, wherein the combination gear mechanism has two toothed gear mechanisms whose toothed racks together form the one gear mechanism output.

21. An electromechanical brake booster configured to transmit a muscular force by a vehicle driver and a boosted force by a brake booster, as operating forces, to a piston of a hydraulic master brake cylinder, the electromechanical brake booster comprising:
   an electric motor;
   a first and second distributor gear that are configured to distribute a gear input between at least two gear paths;
   a rotational/translational conversion gear mechanism that is configured to convert a rotational drive movement of the electric motor into a translational output movement in order to activate the hydraulic master brake cylinder;

the rotational/translational conversion gear mechanism including a first and second combination gear that are configured to combine the at least two gear paths into one gear output;

wherein the first and second distributor gears are worm gears driven via a common worm drive, wherein the worm gears are respectively parts of two gear mechanism paths.

22. The electromechanical brake booster as claimed in claim 21, wherein the at least two gear mechanism paths transmit the same load.

23. The electromechanical brake booster as claimed in claim 21, wherein the first and second combination gears act on the gear output symmetrically.

24. The electromechanical brake booster as claimed in claim 21, wherein the worm gears run in opposite directions.

25. The electromechanical brake booster as claimed in claim 21, wherein the first and second combination gears are configured to engage two toothed gear mechanisms whose toothed racks together form the one gear output.

26. The electromechanical brake booster as claimed in claim 21, wherein a gear ratio between the gear input and the gear output changes along with the rotational drive movement of the electric motor.

27. An electromechanical brake booster, comprising:
an electric motor; and
a gear mechanism which is driven by the electric motor and which includes:
    a rotational/translational conversion gear mechanism which converts a rotational drive movement of the electric motor into a translational output movement in order to activate a hydraulic master brake cylinder, and
    a distributor gear mechanism which distributes a gear mechanism input between at least two gear mechanism paths, wherein the at least two gear mechanism paths are the same;
wherein the rotational/translational conversion gear mechanism further acts as a combination gear mechanism which combines the at least two gear mechanism paths into one gear mechanism output.

28. The electromechanical brake booster as claimed in claim 27, wherein each of the at least two gear mechanism paths transmit the same load.

29. The electromechanical brake booster as claimed in claim 27, wherein the combination gear mechanism acts on the gear mechanism output symmetrically.

30. The electromechanical brake booster as claimed in claim 27, wherein the gear mechanism has multiple stages.

31. The electromechanical brake booster as claimed in claim 27, wherein the gear mechanism is configured such that a gear ratio between the gear mechanism input and the gear mechanism output changes along with the rotational drive movement of the electric motor.

32. The electromechanical brake booster as claimed in claim 27, wherein the distributor gear mechanism has at least two worm gear mechanisms with a common worm drive, wherein the worm gear mechanisms are parts of the at least two gear mechanism paths.

33. The electromechanical brake booster as claimed in claim 32, wherein the at least two worm gears run in opposite directions.

34. The electromechanical brake booster as claimed in claim 27, wherein:
    the combination gear mechanism has, for each gear mechanism path, a respective toothed gear mechanism having a toothed rack; and
    the toothed racks of the toothed gear mechanisms together form the one gear mechanism output.

35. An electromechanical brake booster, comprising:
an electric motor; and
a gear mechanism that includes:
    a first gear stage that is driven by a rotational drive movement of the electric motor; and that distributes a drive force of the electric motor into at least two gear mechanism paths; and
    a second gear stage that is driven by the first gear stage and that combines the least two gear mechanism paths into one gear mechanism output, wherein the one gear mechanism output is a translational output movement configured to activate a hydraulic master brake cylinder.

36. The electromechanical brake booster as claimed in claim 35, wherein each of the at least two gear mechanism paths transmit the same load.

37. The electromechanical brake booster as claimed in claim 35, wherein the second gear stage acts on the one gear mechanism output symmetrically.

38. The electromechanical brake booster as claimed in claim 35, wherein the gear mechanism further includes at least one further gear stage.

39. The electromechanical brake booster as claimed in claim 35, wherein the gear mechanism is configured such that a gear ratio between the gear mechanism input and the gear mechanism output changes along with the rotational drive movement of the electric motor.

40. The electromechanical brake booster as claimed in claim 27, wherein the first gear stage includes at least two worm gear mechanisms with a common worm drive, wherein the worm gear mechanisms are parts of the at least two gear mechanism paths.

41. The electromechanical brake booster as claimed in claim 40, wherein the at least two worm gears run in opposite directions.

* * * * *